US007219837B2

(12) United States Patent
Rietveld

(10) Patent No.: US 7,219,837 B2
(45) Date of Patent: May 22, 2007

(54) IDENTIFICATION SYSTEM

(75) Inventor: Robert Victor Rietveld, Houten (NL)

(73) Assignee: Integrated Engineering B.V., Amsterdam (NL)

(*) Notice: Subject to any disclaimer, the term of this patent is extended or adjusted under 35 U.S.C. 154(b) by 157 days.

(21) Appl. No.: 10/660,368

(22) Filed: Sep. 11, 2003

(65) Prior Publication Data

US 2004/0108377 A1 Jun. 10, 2004

(30) Foreign Application Priority Data

Sep. 12, 2002 (NL) .................................... 1021441
Jan. 10, 2003 (NL) .................................... 1022348

(51) Int. Cl.
*G06K 5/00* (2006.01)

(52) U.S. Cl. ....................................... 235/382; 235/451

(58) Field of Classification Search ................ 235/382, 235/382.5, 380, 435, 451, 492, 487; 382/115, 382/124; 713/186
See application file for complete search history.

(56) References Cited

U.S. PATENT DOCUMENTS 5,623,552 A * 4/1997 Lane .......................... 382/124
5,679,945 A 10/1997 Renner et al.
6,011,858 A 1/2000 Davis et al.
6,085,976 A 7/2000 Sehr
6,219,439 B1 * 4/2001 Burger ....................... 382/115
6,702,181 B2 * 3/2004 Ramachandran ............ 235/380
6,848,052 B2 * 1/2005 Hamid et al. ............... 713/186
6,877,097 B2 * 4/2005 Hamid et al. ............... 713/186
6,971,031 B2 * 11/2005 Haala .......................... 705/44
2002/0089440 A1 7/2002 Lynam et al.
2003/0028814 A1 * 2/2003 Carta et al. ................. 713/202
2003/0131247 A1 * 7/2003 Cannon ....................... 713/186
2003/0163710 A1 * 8/2003 Ortiz et al. ................. 713/186

FOREIGN PATENT DOCUMENTS

EP 0 785 776 B1 12/2000
EP 1 085 424 A1 3/2001
WO WO 96/06409 A1 2/1996
WO WO 98/13791 A1 2/1998
WO WO 02/091311 A1 11/2002

* cited by examiner

*Primary Examiner*—Steven S. Paik
(74) *Attorney, Agent, or Firm*—The Web Law Firm

(57) ABSTRACT

Disclosed is a system for uniquely identifying an entity includes a wireless identification device with a controller mechanism for wirelessly communicating and acquiring, processing and transmitting data. A reader device having a controller mechanism acquires, processes and transmits data and a sensing mechanism is in communication with the reader device for acquiring, processing and transmitting data from the wireless identification device. A wireless control device is included for communicating with the reader device and can communicate with and configure the reader device, the wireless identification device or subsequent wireless identification devices. A method of uniquely identifying an entity is also disclosed.

7 Claims, 4 Drawing Sheets

IDENTIFICATION SYSTEM

BACKGROUND OF THE INVENTION

1. Field of the Invention

The present invention relates generally to systems for uniquely identifying an entity, such as a person or goods and, in particular, to a system for uniquely identifying an entity, providing access control, or registering persons or goods using wireless media.

2. Description of Related Art

Many systems are available for identifying an entity, such as a person or an object, for security, access and inventory purposes. Due to the increasingly stringent requirements imposed regarding access control in the present day, the demand for access and identification equipment will increase. Such equipment typically includes a reader device, which is normally wall mounted, and a unique identification device, such as a portable card or other similar apparatus.

In operation, an individual, who has been assigned a unique identification number or card, slides his or her card through the reader device. The reader device has a controller mechanism that identifies the card and, based upon the information accessible to the reader device, the reader device or a higher level controller mechanism processes the data and decides whether to open an access point or provide other authorization for completing a task. However, if based upon the information, it is decided that the identification information cannot provide for authorized access or should not be provided authorization, the access point or authorization task is locked or prevented. In other common embodiments, as opposed to sliding an identification card through a reader device, it may merely be presented to the reader device having a sensing mechanism. The sensing mechanism "looks at" a portion of the identification card and, as discussed above, decides whether to provide authorization to the card.

In order to provide additional protection and prevent an unauthorized person from stealing or obtaining an identification card that has someone else's authorization information, a scanning device may be provided. This scanning device is in communication with the controller mechanism of the reader device and requires the user to place his or her finger or thumb on the scanning device, thus allowing this device to read the person's fingerprint. If the fingerprint matches an optical or digitized fingerprint contained on the reader device, and further matches the authorization information present on the identification card, the user is authorized to proceed through the access point or engage in some other authorized activity.

Such a system gives rise to various problems. First, current privacy legislation often curtails the ability to collect such highly unique and private information as a person's fingerprint and store it on a third-party device that is out of the user's control, namely the reader device. By storing such information on the reader device, which is often in communication with other systems and networks, this information is particularly accessible to unauthorized collection and abuse. Such systems can be "hacked" or otherwise broken or decrypted, thus allowing the unauthorized user to gain access to this highly private information. Accordingly, it is not desirable to store such sensitive information at any type of centralized repository that can be broken or stolen in order to gain unauthorized access.

With respect to the configuration of the reader device, configuration or control cards have been developed that are better capable of affecting how the reader device functions.

Further, such control cards can be used to program the operation of the reader device. In such a system, the reader device is used to enable contactless or wireless storage and reading of information on a portable medium, such as the identification card. Typically, the portable medium contains a chip, on which the data is stored, and electronics to enable communication with the outside world, such as the reader device. Although such electronics are often placed on a card, it is also possible to mount or place them in different forms or environments. In any case, the reader device has the function of accessing or reading the data on the identification card and then transmitting this data to an external system or placing or writing data onto the card obtained from the external system.

However, as discussed above, the requirements and functionality of the various readers differs from application to application. Even within a specific application, it is often necessary to provide reader devices with different information and functionality. For example, if the card is used in an access control application, it may be necessary that cards of one client may not be read at all by a different client. This can be realized by safeguarding the cards with different cryptographic keys, and only if the reader device has the correct key can it read the card. It may also be the case that a client uses an external system which expects varying protocols.

In order to correct this drawback and work within the system, and as discussed above, reader devices have been designed such that different requirements and functionality of the reader devices can be changed by changing certain parameters. Therefore, the operation of the reader device changes when the parameters are changed, and these parameters are stored in the memory of the reader device itself, such that this adjustment only need take place once. While formerly such parameters were required to be loaded into the reader device by a direct electric connection, these adjustable readers use the above-mentioned control card, which has the parameters influencing the operation of the reader device located on the card itself. By making use of the control card, it is possible to reduce, among other costs, logistical costs by supplying only standard reader devices, providing clients themselves with control cards with which they can program the readers and thus simplifying inventory control, since a reader device supports many different applications, and minimizing the service costs, in that service technicians need only have one reader device type which can be easily re-programmed.

While such wirelessly programmable reader devices and card systems are available, such systems do not provide for the added security provided when using a scanning device that scans or reads a biometric characteristic of a human, such as a fingerprint. In addition, and as discussed above, there are serious drawbacks to storing such sensitive and private information on a reader device that is hardwired to some other control device, which is susceptible to break-ins or other unauthorized access to this data.

SUMMARY OF THE INVENTION

It is, therefore, an object of the present invention to provide a system for uniquely identifying an entity that overcomes the deficiencies of the prior art. It is another object of the present invention to provide a system for uniquely identifying an entity that allows a wireless control device to configure a reader device. It is yet another object of the present invention to provide a system for uniquely identifying an entity where a wireless control device can communicate with and configure a wireless identification device. It is a still further object of the present invention to provide a system for uniquely identifying an entity that uses a scanning device that is capable of reading a biometric characteristic of a human. It is another object of the present invention to provide a system for uniquely identifying an entity that provides a more secure and private platform for storing information. It is a further object of the present invention to provide a method of uniquely identifying an entity that overcomes the deficiencies of the prior art.

Accordingly, a system for uniquely identifying an entity is provided. This system includes at least one wireless identification device having at least one controller mechanism for wireless communication and capable of acquiring, processing and transmitting data signals. A reader device includes at least one controller mechanism for acquiring, processing and transmitting data signals and also has a sensing mechanism in communication with the reader device controller mechanism for acquiring, processing and transmitting data transmitted from the wireless identification device controller mechanism. This system also includes at least one wireless control device having at least one controller mechanism for wireless communication with a reader device controller mechanism and for acquiring, processing and transmitting data signals. The wireless control device controller mechanism is capable of communicating with and configuring the reader device controller mechanism; communicating with and configuring the wireless identification device controller mechanism via the reader device controller mechanism; and/or communicating with and configuring a subsequent wireless identification device controller mechanism via the reader device controller mechanism.

In one preferred embodiment, the system also includes a scanner device in communication with the reader device controller mechanism for acquiring, processing and transmitting data signals that are representative of a unique characteristic of the entity. The data signals may include control signals and an action sequence that includes communicating with and configuring the reader device controller mechanism and/or the wireless identification device controller mechanism. The configuration of the wireless identification device controller mechanism includes: storing the data representative of the unique characteristic of the entity on the wireless identification device controller mechanism and/or the reader device controller mechanism; and erasing at least a portion of the data representative of the unique characteristic of the entity on the wireless identification device controller mechanism and/or the reader device controller mechanism.

A method of uniquely identifying an entity is also provided. This method includes the steps of: (a) providing at least one wireless identification device; (b) providing a reader device; (c) providing at least one wireless control device; (d) providing a scanner device; (e) acquiring data signals representative of at least one unique characteristic of the entity by the scanning device; (f) communicating the data to the reader device; and (g) controlling, by the wireless control device, at least one of the storage and the erasure of the data representative of the unique characteristic of the entity on the wireless identification device, via the reader device.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
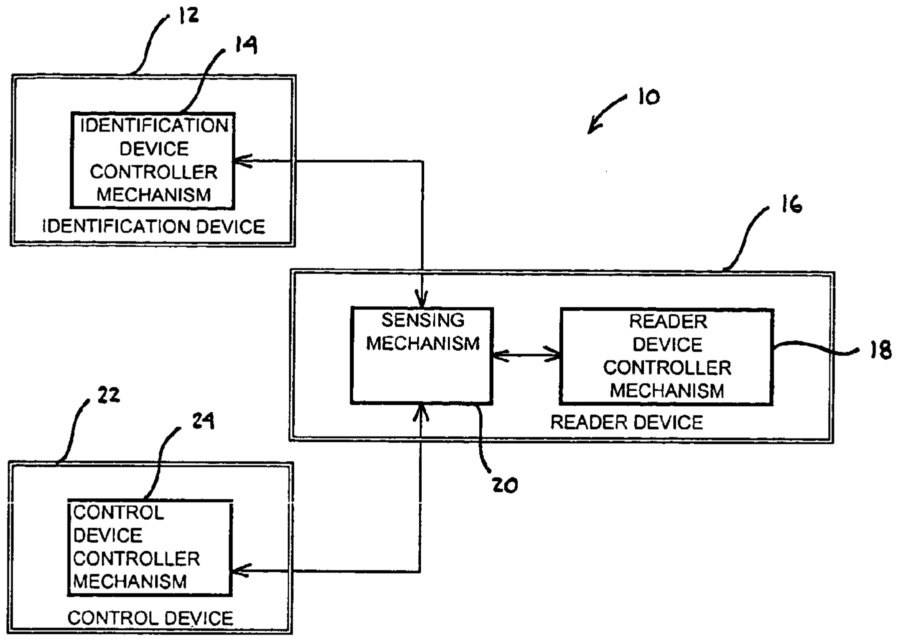
FIG. 1 is a schematic view of a system for uniquely identifying an entity according to the present invention.
Figure 2:
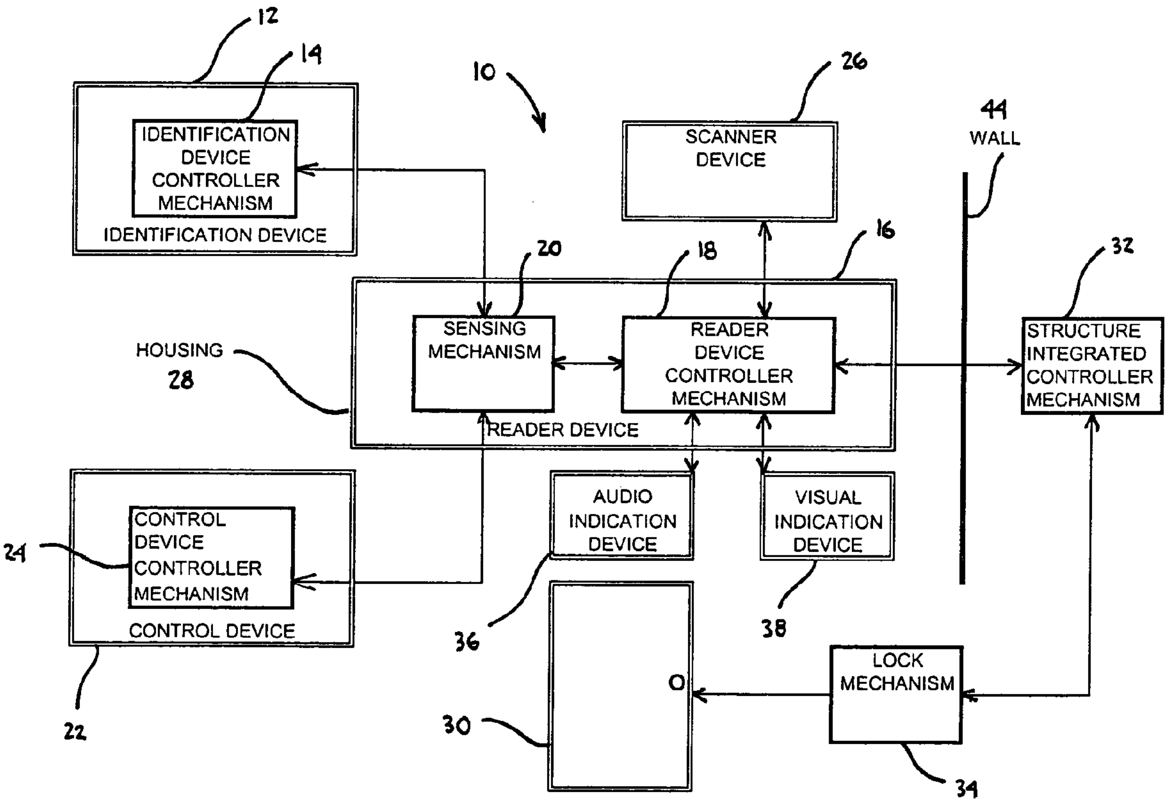
FIG. 2 is a schematic view of a preferred embodiment of a system for uniquely identifying an entity according to the present invention.

The present invention, as illustrated schematically in FIGS. 1 and 2, is a system 10 and method for uniquely identifying an entity (not shown), such as a person. The system 10 includes at least one, and typically multiple, wireless identification devices 12, and each wireless identification device 12 includes a controller mechanism 14 for acquiring, processing and transmitting data signals. This identification device 12 is typically in the form of a card or other similar portable medium. Normally, when using the system 10, each user is issued an identification device 12, in the form of a card, and this identification device 12 includes some unique or semi-unique data on the controller mechanism 14, which is used for authorization purposes.

The identification device controller mechanism 14 may be in the form of a printed circuit board (PCB) or other processing unit or electronics structure. Further, the controller mechanism 14 is capable of acquiring data signals from an external source, processing data, storing data in a storage sub-component and/or transmitting data signals to an external system or network. Such processing and communication functionality, typically in the form of a PCB, is known in the art and may include transponders or other activated or activateable elements that can emit signals, such as radio frequency signals, infrared signals or other digital or analog signals.

The system 10 also includes a reader device 16, and this reader device 16 also has a controller mechanism 18. As with the identification device controller mechanism 14, the reader device controller mechanism 18 can be a PCB, multiple integrated PCBs, separate PCBs in communication with each other or other processing control hardware and/or software. This controller mechanism 18 is also capable of acquiring, storing, processing and transmitting data signals.

The reader device 16 also includes a sensing mechanism 20, which is in communication with the reader device controller mechanism 18. It is the sensing mechanism 20 that allows the reader device 16 to acquire, process and/or transmit the data signals that are emanating from the wireless identification device controller mechanism 14. Once the data signals are obtained from the identification device 12, this data is communicated with and processed by the reader device controller mechanism 18.

The system 10 also includes at least one wireless control device 22. As with the wireless identification device 12, the wireless control device 22 also includes a controller mechanism 24 for wireless communication with the reader device controller mechanism 18 and for acquiring, processing, storing and/or transmitting data signals between the various components and sub-components of the system 10. Also, as with the identification device 12, the wireless control device 22 is typically in the form of a portable medium, such as a card. In addition, the wireless control device controller mechanism 24 is capable of communicating with and configuring the reader device controller mechanism 18, communicating with and configuring the wireless identification device controller mechanism 14 via the reader device controller mechanism 18 and communicating with and configuring a subsequent wireless identification device controller mechanism 14 (when multiple identification devices 12 are used in the system 10) via the reader device controller mechanism 18.

In operation, the wireless control device controller mechanism 24 wirelessly communicates specified data signals to the reader device controller mechanism 18, and the reader device 16 performs an action sequence based upon the content and/or commands in the data signals. In a preferred embodiment, these data signals constitute control signals, and the action sequence includes communicating with and configuring the reader device controller mechanism 18 and/or the wireless identification device controller mechanism 14. Therefore, the control device 22 is capable of configuring, manipulating or otherwise affecting the operation of not only the reader device 16, but also the identification devices 12.

There are many configuration options and control capabilities between the control device 22, the reader device 16 and the identification device 12. For example, the control device 22 may transmit and cause to be stored on the reader device 16 or the identification device 12 a unique identification value that is representative of the identity of the wireless identification device 12. For example, each identification device 12 may be assigned a specific number, code or other characteristic that is unique or semi-unique to the identification device 12. This identification value would be unique when each card is assigned a specific and distinct value, and this identification value would be semi-unique when multiple cards are assigned a specific value, such as when multiple people are assigned to groups, and it is each group that has a separate identification value. Also, the control device 22 may cause at least a portion of this data to be erased on the reader device controller mechanism 18 or the identification device controller mechanism 14. This functionality allows the identification value to be modified or erased without the requirement of destroying the identification device 12 or card.

As seen in FIG. 2, in one preferred and non-limiting embodiment of the present invention, the system 10 also includes a scanner device 26 in communication with the reader device controller mechanism 18. This scanner device 26 may include a separate electronic structure or PCB, however, this scanner device 26 is in operable communication with and typically controlled by the reader device controller mechanism 18. The scanner device 26 is capable of acquiring, processing and transmitting data signals, but is typically used only to acquire data signals. These data signals are representative of at least one unique characteristic of the entity or person. For example, this unique characteristic may be a biometric property of the person, such as a fingerprint, a retinal print, a dermal sample, etc. In the preferred embodiment, the scanner device 26 is a fingerprint scanner and is situated and structured so as to allow a person to place his or her thumb or finger on the scanner device 26, and the thumb or fingerprint is read by the scanner device 26 and communicated to the reader device controller mechanism 18. The reader device controller mechanism 18 may store the fingerprint scan in an analog, digital, optical or other similar format for subsequent transmission or look-up.

In this embodiment, the wireless identification device controller mechanism 14 is capable of storing the data representative of the unique characteristic of the entity. In addition, this data can be erased or modified on the identification device controller mechanism 14. Still further, in a preferred embodiment, it is the control device 22 that causes or commands the reader device controller mechanism 18 to obtain, store, process or transmit this data representative of the unique characteristic of the entity to the specified identification device controller mechanism 14. In this manner, a person's fingerprint data can be merely processed by the reader device controller mechanism 18 and caused to be transmitted to the identification device controller mechanism 14 and erased from the reader device controller mechanism 18. This means that this sensitive information is not stored in any database or PCB, other than the identification device controller mechanism 14, which is unique and controlled by the assigned user.

The data signals may also be control signals, and the action sequence may also include communicating with a subsequent wireless control device controller mechanism 24. This means that one or a central control device 22 may be used to configure, read or verify a subsequent wireless control device 22. It may also be preferable to utilize multiple control devices 22, with each control device 22 having a different function. For example, one control device may be used to cause data signals, such as the data representing the unique characteristic of the entity, to be stored on the wireless identification device 12, and another or subsequent control device 22 can cause the data, such as data representing the unique characteristic of the entity, to be erased or otherwise manipulated on the identification device 12.

The reader device 16 typically includes a housing 28, which is normally a wall-mounted housing attached at or near an access point 30. In addition, the reader device 16 is in communication with a structure integrated controller mechanism 32. In a preferred and non-limiting embodiment, the reader device 16, and specifically the reader device controller mechanism 18, is hardwired or cabled directly to the structure integrated controller mechanism 32, which is typically in the structure or in another area or location. This structure integrated controller mechanism 32 is also configured to acquire, process, store and transmit data signals.

In one example, the reader device controller mechanism 18 is hardwired to a router or other communications device that, in turn, transmits data or information to a central computing system or network that controls the overall system, for example a building. In operation, the wireless identification device controller mechanism 14 and/or the wireless control device controller mechanism 24 transmits specified data signals to the reader device controller mechanism 18 and the reader device 16 performs an action sequence based on these signals. When the reader device 16 is in communication with a structure integrated controller mechanism 32, this controller mechanism 32 can also perform some action sequence or control sequence based upon the content of the data signals. In one preferred and non-limiting embodiment, the structure integrated controller mechanism 32 is in communication with a lock mechanism 34. In addition, the lock mechanism 34 is in communication with the access point 30, which is typically a door or other restricted access point. The lock mechanism 34 prevents access through the access point 30, and the action sequence that is initiated based upon the content of the data transmitted by the identification device 12 or control device 22 is to temporarily disable the lock mechanism 34, thereby allowing the user to proceed through the access point 30.

The sensing mechanism 20 may be a swipe system, an optical system, an antenna or radio frequency-based system or other device that allows the reader device 16 to acquire signals from the identification device 12 or the control device 22. In operation, a user either swipes his or her identification device 12 or holds this identification device 12 in substantially close proximity to the reader device 16, and the data signals are obtained by the sensing mechanism 20 and processed by the reader device controlling mechanism 18. If the appropriate identification data is transmitted by the identification device 12 or control device 22, the reader device controller mechanism 18 transmits this data to the structure integrated controller mechanism 32 which, in turn, commands the lock mechanism 34 to be disabled and allow the user to pass through the access point 30. The reader device controller mechanism 18 may also simply act as a conduit of the data signals from the identification device 12 and/or the control device 22, simply passing these signals directly to the structure integrated controller mechanism 32 which includes the appropriate logic and control software and hardware to make a decision regarding authorization and access.

When using the scanner device 26, and further when this scanner device 26 is a fingerprint acquisition mechanism, the user first places his or her identification device 12 in front of the reader device 16 or swipes the card through the sensing mechanism 20, and then places his or her finger on the scanning device 26. Since the identification device 12 and/or the control device 22 has the data representing the unique identity of the entity resident or stored thereon, the reader device controller mechanism 18 can process, verify and resolve whether the fingerprint matches the identification device 12. This provides added security and prevents an unauthorized user from stealing or otherwise obtaining an identification device 12 that belongs to another person and gaining access through the access point 30. Further, the present system 10 allows this sensitive data, namely the digitized or analog optical copy of the fingerprint, to be stored exclusively on the identification device 12 of the user. While the identification device 12 and the control device 22 may be integrated into a single portable medium, such as a card, this is typically not advisable and allows too much control to the cardholder.

The reader device 16, and typically the housing 28 of the reader device 16, may include an audio indication device 36 and/or at least one visual indication device 38 that is in communication with and controlled by the reader device controller mechanism 18. The audio indication device 36 can be used for producing audio signals that provide information to the user, notify the user of unauthorized or authorized activity, or otherwise communicate by sound. Similarly, the visual indication device 38 may include one or more lights, screens, LEDs or other visual indications of the same information.

Figure 3:
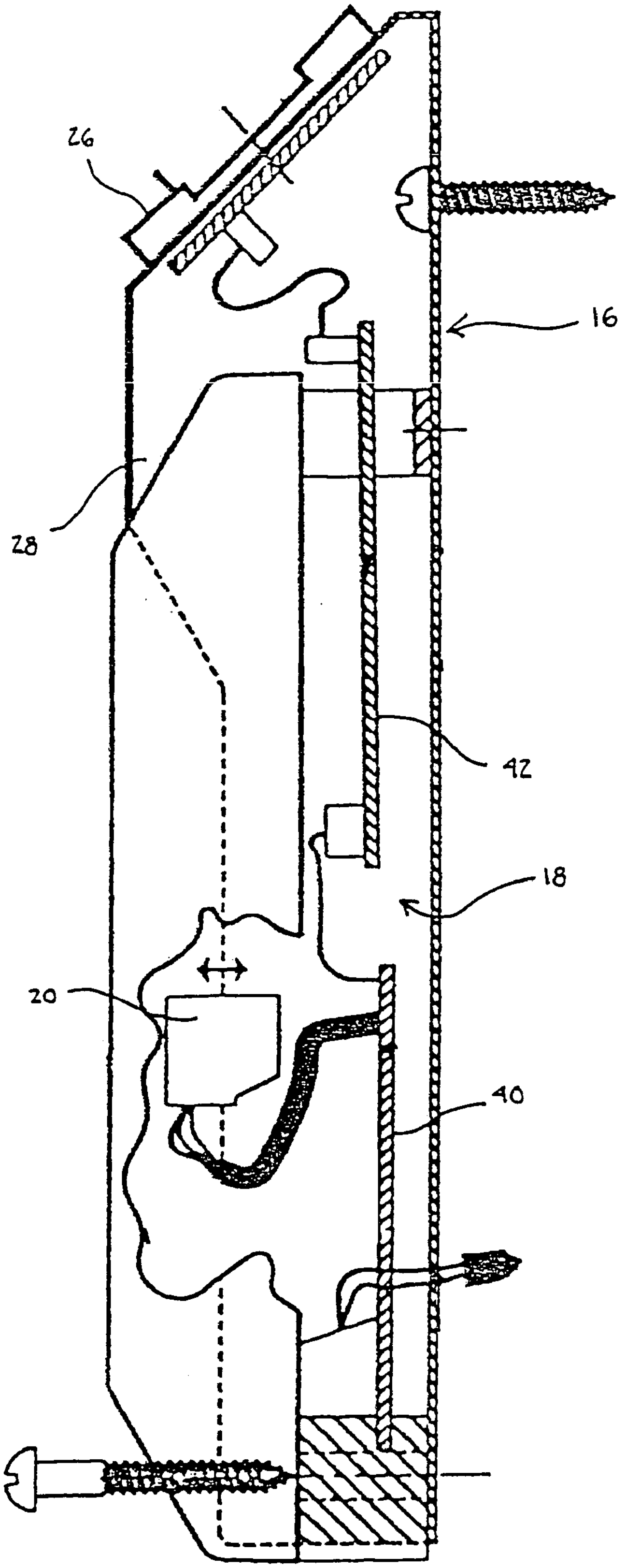
FIG. 3 is a side sectional view of one preferred embodiment of a reader device for use in the system of FIG. 1.

One preferred embodiment of the reader device is illustrated in FIG. 3. In this embodiment, the sensing mechanism 20 is wired directly to a first printed circuit board 40. Similarly, the scanner device 26 is directly wired to a second printed circuit board 42. The first printed circuit board 40 and the second printed circuit board 42 are wired and in communication with each other. Additionally, the first printed circuit board 40 is directly wired to and in communication with the structure integrated controller mechanism 32, which is typically within or behind a wall 44. While this shows one specific arrangement, any structure and arrangement is envisioned, which accomplishes these functions and tasks.

EXAMPLE

In one example of the present system 10, the reader device 16 can function in two different modes, namely the 3964-mode or the stand-alone mode. In the 3964-mode, the functioning of the reader device 16 is controlled by an external system, such as the structure integrated controller mechanism 32, whereby reading of the control device 22 is only possible in this mode during start-up. In the stand-alone mode, the control device 22 can be read during the start-up of the reader device 16, but also during normal operation. Normal operation means that the reader device 16 reads identification devices 12 and transmits the data on the identification device 12 to an external system, such as the structure integrated controller mechanism 32.

Figure 4:
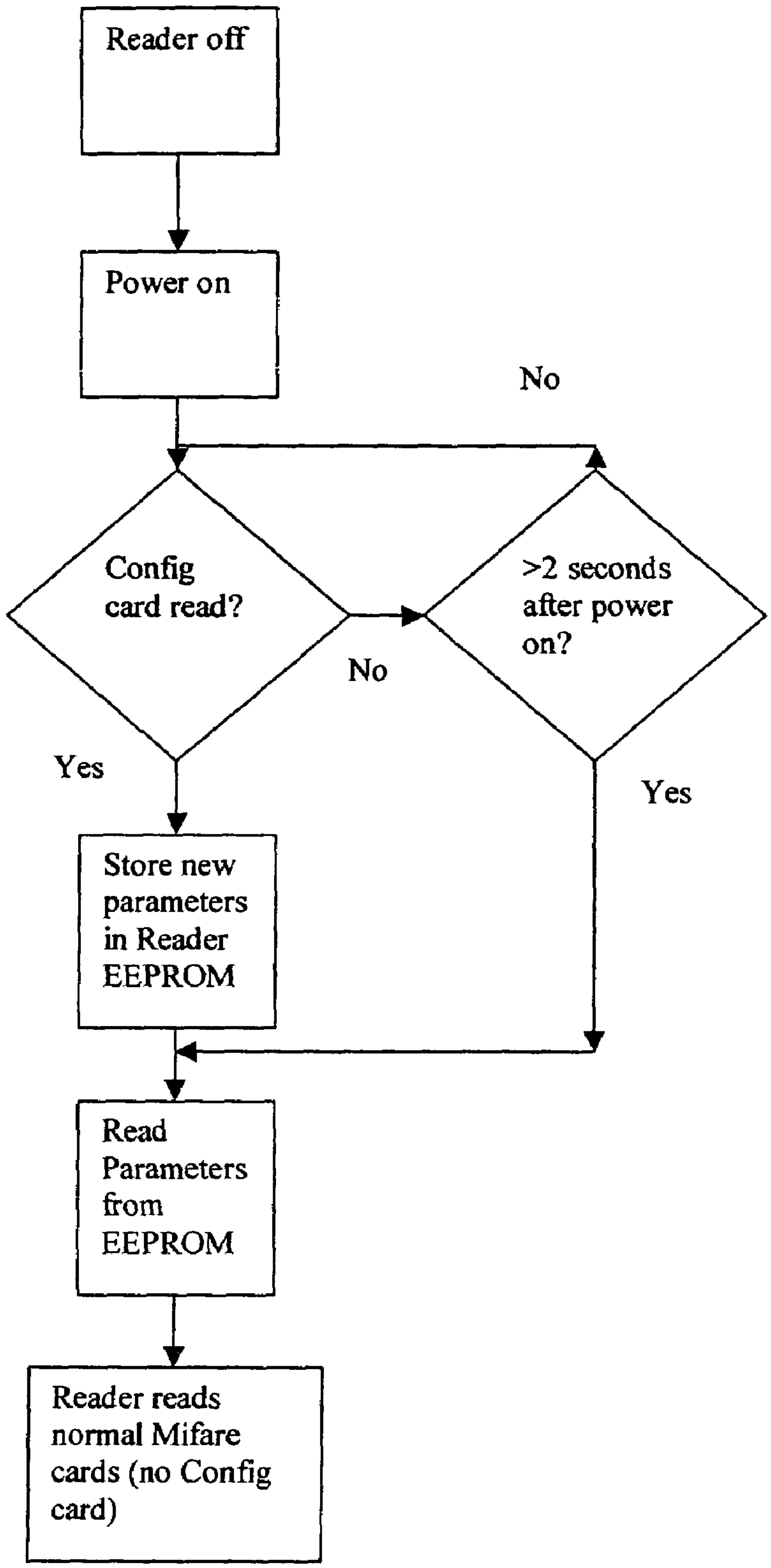
FIG. 4 is a flow chart of a preferred operating mode of the system according to the present invention during power-up of a reader device.
Figure 5:
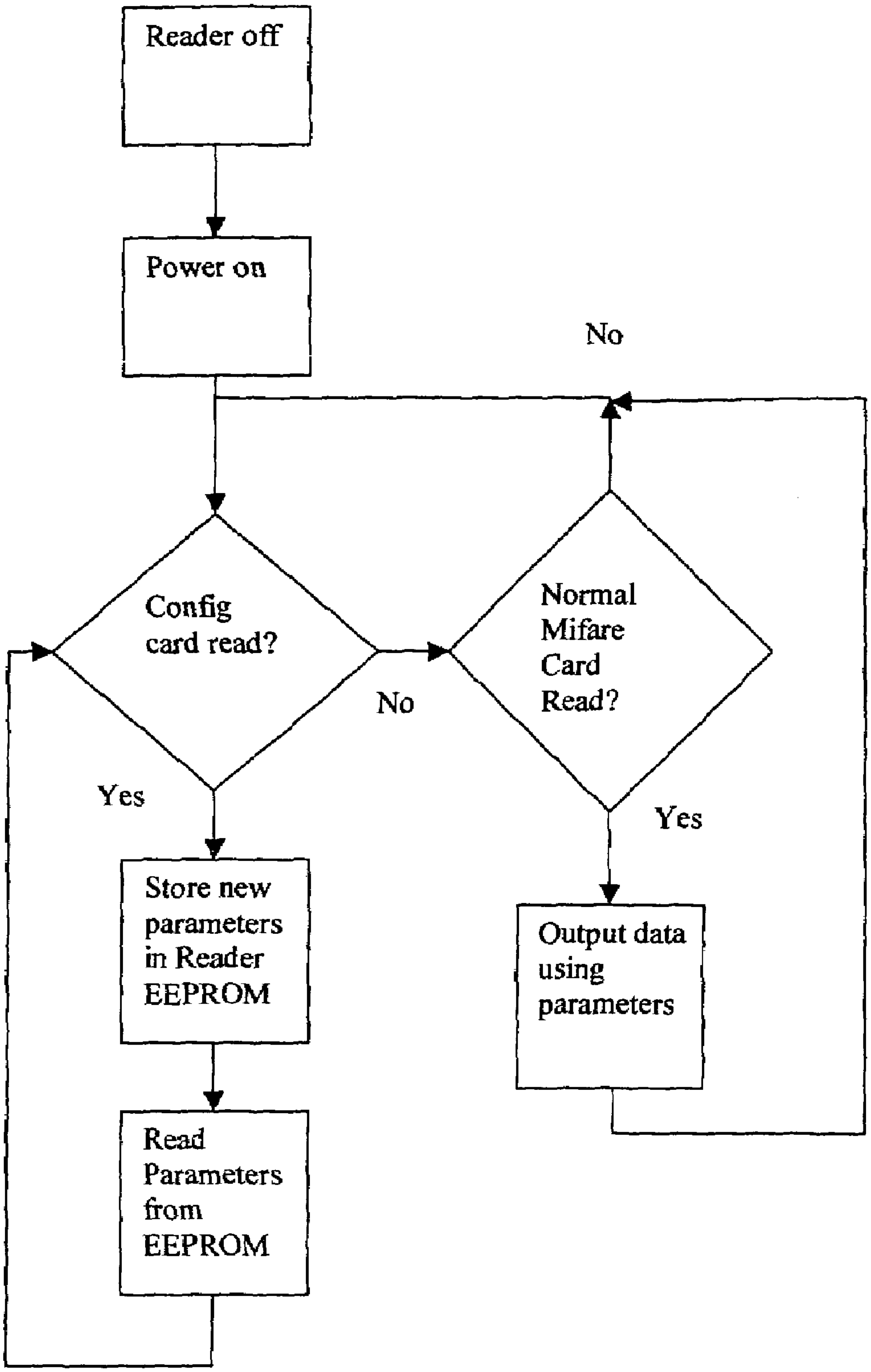
FIG. 5 is a flow chart of a further preferred operating mode of the system according to the present invention during power-up of a reader device.

Flow charts illustrating the operation of the system 10 in different and preferred operating modes are shown in FIGS. 4 and 5. In the mode of operation shown in FIG. 4, when the reader device 16 is powered, the reader device 16 attempts to read the control device 22. If no control device 22 is read after two seconds, the reader device 16 continues to attempt to read a control device 22. If a control device 22 is read, the new parameters are stored in the reader device controller mechanism 18. Next, and further if a control device 22 is read after a period greater than two seconds after power-up, the parameters are read from the reader device controller mechanism 18. Finally, the reader device 16 returns to a normal mode for reading identification devices 12. In the mode shown in FIG. 5, after the reader device 16 is powered on, the reader device 16 attempts to read the control device 22, and if the control device 22 is not encountered, a decision is made whether the reader device 16 should return to normal identification device 12 reading operations. If not, the reader device 16 again attempts to read a control device 22, and if so, the data is output using the parameters and the reader device 16 again attempts to read a control device 22. When a control device 22 is read, new parameters are stored in the reader device controller mechanism 18, and these parameters are read from the reader device control mechanism 18. The reader device 16 then returns to a state of attempting to read a control device 22.

Immediately after start-up of the reader device 16, and regardless of whether the reader device 16 is in 3964-mode or stand-alone mode, the reader device 16 attempts to read a control device 22 for one second. This one-second period is indicated by switching on of a first LED 46 and a second LED 48. If no control device 22 is read during this period, the reader device 16 continues with its normal operation. This means that a reader device 16 in the 3964-mode can only be configured with a control device 22 at power up. After reading a control device 22, the reader device 16 is reset in order to activate the parameters.

In stand-alone mode, the reader device scans a sector zero for a possible directory. The directory indicates what type of information and for which application is in which sector in the control device 22. Therefore, each application may have its own identifier. After reading the control device 22, again the reader device 16 is reset in order to activate the parameters.

During power-up, the first LED 46 (red) flashes two times in a period of two seconds, and this means that the monitor can be activated. If the monitor is not activated, the reader device 16 continues start-up to the application program. The application program starts loading the parameters from the permanent memory, and the time required for this purpose depends on the quantity of parameter data and flash bank zero. Both the first LED 46 and the second LED 48 then come on for a period of one second and indicate that the reader device 16 is attempting to read a control device 22. When a control device 22 is presented to the reader device 16 and the reader device 16 sees that it is a control device 22, the second LED 48 (green) comes on and the first LED 46 goes out if it was on. As long as the reader device 16 is occupied with reading and processing the control device 22, the second LED 48 remains on.

A control device 22 can be accepted or not accepted by the reader device 16. If a control device 22 is accepted, when it has been fully read and processed, the reader device 16 first gives a buzzer signal through the audio indication device 36 and the second LED 48 then begins to flash rapidly for a period of one second. The reader device 16 is then reset and starts again at the monitor. If a control device 22 is not accepted, the second LED 48 goes out and the reader device 16 gives three short buzzer signals. The first LED 46 then begins to flash rapidly for a period of one second. The non-acceptance of a control device 22 may occur for several reasons: (1) if the keys of the control device 22 and the reader device 16 do not correspond; (2) if the version control functionality and data in the reader device 16 and the control device 22 do not correspond; or (3) when some other error occurs during the reading of the control device 22.

The default key for reading a control device 22 is a secret or unique key determined by the manufacturer. Because this key is the same in every reader device 16, the first client can reprogram a reader device 16 of a second client with the control device 22, which is not desirable. It is, therefore, possible using a specific parameter to modify the key with which the control device 22 is read. Note that this key is loaded onto the reader device 16 in an encrypted form. The reader device 16 reads the entire control device 22 with a default cryptographic key unless the parameter exists, and then the control device 22 is read only using this key.

The control device 22 version control is a security feature supported by the reader device 16 to prevent reading of an older control device 22. In order to use this version control, the control device 22 must have a version number. This version number is placed on the control device 22 as a parameter variable. Each control device 22 with version control therefore has a version number which can be entered by the user during programming of the control device 22. With this version number, the user can invalidate an older control device 22 with an older version number, and the reader device 16 remembers the version number of the last read control device 22 and from then on will only accept a control device 22 with the same or more recent version number. If the user does not wish to make use of this version control, the parameters need not be set or modified. If the parameter variable for the version control is not set and is therefore at zero, the option is switched off.

This functional and adaptable control device 22/reader device 16 system is also adaptable for use in connection with the scanner device 26. The use of the scanner device 26 provides an even higher level of security, since an authenticated identification device 12 alone is not sufficient to gain access. Instead, the fingerprint or other biometric characteristic of the user of the identification device 12 must also correspond with this data as stored on the identification device 12. It is, therefore, not possible to use someone else's identification device 12 to gain access.

In the normal mode of the reader device 16, the reader device 16 is waiting for an identification device 12 that contains a finger-scan profile or other unique biometric data of the identification device 12 holder. After the identification device 12 is read, the holder or user must then place his or her finger on the scanner device 26. The finger-scan profiles are compared and, if they correspond, the reader device transmits access information to the structure integrated controller mechanism 32.

Of course, it is assumed that in this situation, the finger-scan profile is already present on the identification device 12. It is necessary to have a method of writing the profile onto the identification device 12, and this is possible using a specifically-designed control device 22. This control device 22 may take the form of one or more portable media, for example one control device 22 may command the reader device 16 to enroll a person or transfer data to the identification device 12 or erase information and cause this data to be deleted from the identification device 12.

In addition to the parameters influencing the read-out security of the control device 22 itself or the access control data, there are specific parameters which influence the operation of the reader device 16 in particular. For example, certain codes can be placed on the identification device 12, the control device 22 and/or the reader device 16. For example, the enroll code makes it possible to determine which control devices 22 are valid in which reader devices 16. Only if the enroll code in the reader device 16 is the same as the enroll code on the control device 22 will the control device 22 work in the reader device 16. As discussed above, version control can be used, and this parameter ensures that if the control device 22 is lost, this lost control device 22 can be invalidated by producing a new control device 22 with a higher version value. When this new control device 22 has been read, the reader device 16 remembers this so that only control devices 22 of an equal or higher value are valid.

The reader device 16 provides personalized information to the structure integrated controller mechanism 32 after an identification device 12 or a control device 22 has been read by the reader device and a finger-scan of the person corresponds with the finger-scan previously stored on the identification device 12 or control device 22. The scanner device 26 can read a finger-scan and then generate a data set for transmission or storage. In addition, the scanner device 26 can record a finger-scan and compare this to a data set in order to confirm that the read fingerprint is the same as the previous reading. Different parameters of the reader device 16 are adjustable by the control device 22. By presenting this control device 22 to the reader device 16, the parameters in the control device 22 are read and stored in the reader device 16.

In order to store a finger-scan profile on an identification device 12 or a control device 22, the user presents the control device 22 to the reader device 16; the reader device 16 transmits a "read finger-scan" command to the scanner device 26; the user places his or her finger on the scanner device 26; the scanner device transmits the finger-scan profile to the reader device controller mechanism 18; the user presents to the reader device 16 the identification device 12 to be written; and the reader device controller mechanism 18 writes this profile onto the identification device 12. All these steps are indicated by the signal LEDs.

In order to erase the finger-scan profile from the identification device 12, the user presents a specific control device 22 to the reader device 16 and presents the identification device 12 that requires erasing to the reader device 16, and then the reader device controller mechanism 18 erases the profile from the identification device 12.

In order to verify the holder of the identification device 12 and provide access through the access point 30, the following steps are followed: the user presents his or her identification device 12 to the reader device 16; the reader device 16 reads the finger-scan profile present on the identification device 12; the reader device 16 transmits a "verify finger-scan" command to the finger-scan electronics or scanner device 26 together with the read profile; the user places his or her finger on the scanner device 26; the scanner device 26 reads the finger profile; the scanner device 26 or associated electronics transmits to the reader device controller mechanism 18 a confirmation or rejection of the likeness between the finger-scans; and if a confirmation is received, the access control data is transmitted to the structure integrated controller mechanism 32, or if a rejection is received, this is indicated by the audio indication device 36 and/or the visual indication device 38.

In one preferred embodiment, a third LED 50 (green) and a fourth LED 52 (orange) are located on the side of the reader device 16 housing 28. The third LED 50 and the fourth LED 52 indicate the status of the reader device 16 during use of the control device 22. The first LED 46 and the second LED 48 are in the front of the reader device 16 housing 28. The first LED 46 is on when there is current being supplied to the reader device 16, and the second LED 48 flashes when access is denied and comes on briefly if access is granted.

In this manner, a system 10 for uniquely identifying an entity is provided. While discussed above in connection with authorization or prevention of access through an access point 30, any unique identification function or application is envisioned. For example, the system 10 can be used in connection with identifying or granting access to goods or other objects. By storing the sensitive biometric information and data on the identification device 12, the reader device 16 and the structure integrated controller mechanism 32 do not need to obtain and store this information, which drastically increases the security of the system 10. The present system 10 and method allow for the secure and functional identification of an entity, such as a person, and are able to act accordingly.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of uniquely identifying an entity, comprising the steps of:

(a) providing at least one portable wireless identification device;

(b) providing a reader device;

(c) providing at least one portable wireless control device;

(d) providing a scanner device;

(e) acquiring data signals representative of at least one unique characteristic of the entity by the scanning device;

(f) communicating the data to the reader device;

(g) controlling, by the wireless control device, the storage of the data representative of the unique characteristic of the entity on the wireless identification device, via the reader device, and the erasure of the data representative of the unique characteristic of the entity from the reader device and/or the wireless control device; and (i) configuring the reader device by the wireless control device;

(ii) configuring the wireless identification device by the wireless control device via the reader device; and/or (iii) configuring a subsequent wireless identification device by the wireless control device via the reader device.

2. The method of claim 1, further comprising the steps of:

wirelessly communicating specified data signals by the wireless control device to the reader device; and performing an action sequence by the reader device based upon the data signals.

3. The method of claim 1, wherein the entity is a person and the unique characteristic is a biometric property of the person.

4. The method of claim 3, wherein the biometric property is one of a fingerprint, a retinal print and a dermal sample.

5. The method of claim 1, wherein at least one of the wireless identification device and the wireless control device is in the form of a portable card.

6. The method of claim 1, wherein the reader device is in the form of an enclosed housing having at least a portion for allowing the acquisition and transmission of data signals therethrough.

7. The method of claim 1, wherein the reader device further includes at least one of an audio indication device and a visual indication device in communication with and controlled by the reader device.

* * * * *

UNITED STATES PATENT AND TRADEMARK OFFICE

CERTIFICATE OF CORRECTION

PATENT NO. : 7,219,837 B2 
APPLICATION NO. : 10/660368
DATED : May 22, 2007
INVENTOR(S) : Rietveld It is certified that error appears in the above-identified patent and that said Letters Patent is hereby corrected as shown below:

Title Page, Item (56) References Cited, U.S. PATENT DOCUMENTS, Column 2, the sixth reference “2002/0089440” should read -- 2002/0089410 --

Signed and Sealed this

Eighteenth Day of September, 2007

JON W. DUDAS
*Director of the United States Patent and Trademark Office*